United States Patent
Wittenschlaeger (10) Patent No.: US 11,463,380 B2
(45) Date of Patent: Oct. 4, 2022

(54) DYNAMIC PACKET ROUTING

(71) Applicant: Nant Holdings IP, LLC, Culver City, CA (US)

(72) Inventor: Thomas Wittenschlaeger, Flowery Branch, GA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 130 days.

(21) Appl. No.: 16/834,994

(22) Filed: Mar. 30, 2020

(65) Prior Publication Data

US 2020/0358718 A1 Nov. 12, 2020

Related U.S. Application Data (63) Continuation of application No. 13/626,302, filed on Sep. 25, 2012, now Pat. No. 10,637,799.
(Continued)

(51) Int. Cl.
*H04L 49/25* (2022.01)
*H04L 45/12* (2022.01)

(52) U.S. Cl.
CPC .............. *H04L 49/25* (2013.01); *H04L 45/12* (2013.01)

(58) Field of Classification Search
CPC ......... H04L 45/12; H04L 49/25; H04L 67/12; H04L 67/18; H04L 9/3247; H04L 65/1023; H04L 67/02; H04L 67/42; H04L 12/10; H04L 12/40045; H04L 67/10; H04L 67/303; H04L 12/1453; H04L 12/2809; H04L 12/2812; H04L 12/40013; H04L 2012/2841; H04L 2012/2849; H04L 2463/062; H04L 27/01; H04L 27/148;
(Continued)

(56) References Cited

U.S. PATENT DOCUMENTS

| 5,541,914 A | 7/1996 | Krishnamoorthy |
| 5,825,779 A | 10/1998 | Putnins |

(Continued)

FOREIGN PATENT DOCUMENTS

| EP | 0 969 621 | 1/2000 |
| EP | 2 355 423 | 8/2011 |

(Continued)

OTHER PUBLICATIONS

Badis, et al., Quality of Service for Ad hoc Optimized Link State Routing Protocol (QOLSR) draft-badis-manet-qolsr-03.txt, Mar. 2006.
(Continued)

*Primary Examiner* — Khaled M Kassim
*Assistant Examiner* — Zhaohui Yang
(74) *Attorney, Agent, or Firm* — Harness Dickey & Pierce P.L.C.

(57) ABSTRACT

Dynamic packet routing based on fabric awareness information is presented. Networking nodes in a networking fabric observe environmental properties across the fabric. When differences in environment properties between portions of the fabric are detected, differences in power consumption costs for example, the fabric generates corresponding routing tables. The networking nodes can then route traffic in a manner that is sensitive to the environment properties, power consumption or the cost of power for example.

20 Claims, 4 Drawing Sheets

Related U.S. Application Data (60) Provisional application No. 61/540,932, filed on Sep. 29, 2011.

(58) Field of Classification Search
CPC ............. H04L 27/2601; H04L 27/2602; H04L 27/2614; H04L 27/2636; H04L 27/2646; H04L 27/2647; H04L 27/265; H04L 29/08072; H04L 41/082; H04L 41/142; H04L 41/147; H04L 41/22; H04L 45/24; H04L 47/10; H04L 5/0007; H04L 5/0021; H04L 5/0023; H04L 5/0035; H04L 5/0037; H04L 5/0073; H04L 63/0428; H04L 63/08; H04L 63/1408; H04L 63/1441; H04L 67/22; H04L 69/329; Y02T 10/84; H04W 4/029; H04W 4/02; H04W 4/023; H04W 4/026; H04W 4/027; H04W 4/80; H04W 4/90; H04W 64/00; H04W 4/025; H04W 4/38; H04W 4/18; H04W 24/02; H04W 48/16; H04W 4/021; H04W 4/08; H04W 52/0277; H04W 12/02; H04W 12/04; H04W 12/06; H04W 12/12; H04W 12/50; H04W 16/14; H04W 36/00835; H04W 36/0085; H04W 4/00; H04W 4/21; H04W 68/00; H04W 72/046; H04W 88/06; H04W 8/00; H04W 8/005; H04W 8/20; H04W 8/22
See application file for complete search history.

(56) References Cited

U.S. PATENT DOCUMENTS

| | | | |
|---|---|---|---|
| 7,058,826 B2 | 6/2006 | Fung | |
| 7,185,138 B1 | 2/2007 | Galicki | |
| 7,383,330 B2 | 6/2008 | Moran | |
| 7,512,822 B2 | 3/2009 | Fung | |
| 7,548,545 B1 | 6/2009 | Wittenschlaeger | |
| 7,558,976 B2 | 7/2009 | Fung | |
| 7,634,671 B2 | 12/2009 | Frietsch | |
| 7,711,978 B1 | 5/2010 | Roy | |
| 7,783,910 B2 | 8/2010 | Felter | |
| 7,876,757 B2 | 1/2011 | Jain | |
| 8,107,458 B1 | 1/2012 | Ranganathan | |
| 2002/0109879 A1* | 8/2002 | Wing So | H04J 14/0241 398/58 |
| 2002/0161885 A1 | 10/2002 | Childers | |
| 2003/0193405 A1 | 10/2003 | Hunt | |
| 2005/0068968 A1 | 3/2005 | Ovadia | |
| 2006/0080318 A1 | 4/2006 | Huston | |
| 2008/0317021 A1* | 12/2008 | Ives | G06F 11/3051 370/389 |
| 2009/0097402 A1 | 4/2009 | Stumped | |
| 2009/0238178 A1* | 9/2009 | Giles | H04L 67/125 370/360 |
| 2010/0229016 A1 | 9/2010 | Kodama | |
| 2010/0235490 A1* | 9/2010 | Nasnas | H04L 43/0817 709/224 |
| 2010/0284287 A1* | 11/2010 | Venuto | H04W 40/08 370/252 |
| 2010/0312913 A1 | 12/2010 | Wittenschlaeger | |
| 2011/0019552 A1* | 1/2011 | Karaoguz | H04L 45/124 370/236 |
| 2011/0055611 A1 | 3/2011 | Sharma | |

FOREIGN PATENT DOCUMENTS

| | | |
|---|---|---|
| GB | 2 318 250 | 4/1998 |
| WO | WO-199508883 | 3/1995 |

OTHER PUBLICATIONS

Serrar, et al., Towards Hardware Accelerated Software Routers, ACM CoNEXT Student Workshop, Nov. 30, 2010. Philadelphia, USA, pp. 1-2.

* cited by examiner

Figure 1

Table 2. Regional Variation in Levelized Cost of New Generation Resources, 2016.

| Plant Type | Range for Total System Levelized Costs (2009 $/megawatthour) | | |
|---|---|---|---|
| | Minimum | Average | Maximum |
| Conventional Coal | 85.5 | 94.8 | 110.8 |
| Advanced Coal | 100.7 | 109.4 | 122.1 |
| Advanced Coal with CCS | 126.3 | 136.2 | 154.5 |
| Natural Gas-fired | | | |
|    Conventional Combined Cycle | 60.0 | 66.1 | 74.1 |
|    Advanced Combined Cycle | 56.9 | 63.1 | 70.5 |
|    Advanced CC with CCS | 80.8 | 89.3 | 104.0 |
|    Conventional Combustion Turbine | 99.2 | 124.5 | 144.2 |
|    Advanced Combustion Turbine | 87.1 | 103.5 | 118.2 |
| Advanced Nuclear | 109.7 | 113.9 | 121.4 |
| Wind | 81.9 | 97.0 | 115.0 |
| Wind – Offshore | 186.7 | 243.2 | 349.4 |
| Solar PV | 158.7 | 210.7 | 323.9 |
| Solar Thermal | 191.7 | 311.8 | 641.6 |
| Geothermal | 91.8 | 101.7 | 115.7 |
| Biomass | 99.5 | 112.5 | 133.4 |
| Hydro | 58.5 | 86.4 | 121.4 |

Source: Energy Information Administration, Annual Energy Outlook 2011, December 2010, DOE/EIA-0383(2010)

DYNAMIC PACKET ROUTING

CROSS-REFERENCE TO RELATED APPLICATIONS

This application is a continuation of U.S. patent application Ser. No. 13/626,302 filed on Sep. 25, 2012, and claims the benefit of priority to U.S. provisional application 61/540,932 filed on Sep. 29, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is network infrastructure technologies.

BACKGROUND

Networking infrastructures comprise computing devices capable of receiving packets of data and forwarding the packets to desired destinations. Typically networks include multiple interconnected networking nodes, each node having ingress and egress ports through which traffic flows according to one or more forwarding rules. Each node exists in a physical environment that affects the cost to keep the node active, not the least of which is power consumption. Power consumption can increase when networking nodes must route a heavy traffic load.

Others have put forth some effort toward managing power consumption in networks. For example, U.S. patent application publication 2010/0229016 to Kodama et al. titled "Assessing Conditions of Power Consumption in Computer Network", filed Dec. 11, 2009, describes collecting power consumption information from connecting device. The information is used to present a manager with itemized power consumption on a unit-by-unit basis.

Another example in a similar vein as Kodama includes U.S. Pat. No. 7,783,910 to Felter et al. titled "Method and System for Associating Power Consumption of a Server with a Network Address Assigned to the Server", filed Mar. 30, 2007. Felter takes a step further in analysis of power consumption by inspecting network traffic to determine a network address, which can then be associated with a power outlet.

Yet another example includes U.S. Pat. No. 7,634,617 to Frietsch et al. titled "Determining Power Consumption in Networks", filed Jul. 26, 2006. Frietsch also contemplates determining a total electric power consumption of a network of networked devices. Kodama, Felter, and Frietsch provide useful information, but fail to address managing consumption or costs, especially in an environment where costs can vary from one networking node to another.

U.S. patent application 2011/0055611 to Sharma et al. titled "System for Controlling Power Consumption of a Network", filed Jun. 17, 2010, makes further progress by selecting a network configuration of networking nodes that has the lowest power consumption. Interestingly, Sharma contemplates that determining a network configuration having the lowest overall power consumption can include a particular network path for transmitting network flow. However, Sharma also fails to appreciate monetary costs can vary from one networking node to another where the cost variance can give rise to cost optimization. Further, the references above fail to appreciate that differences in networking node environments can be leveraged to generate dynamically adjustable routing policies to improve network operation.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Thus, there is still a need for networking nodes that dynamically adjust packet routing policies.

SUMMARY OF THE INVENTION

The inventive subject matter provides apparatus, systems and methods in which a networking fabric can be constructed from networking nodes capable of dynamically adjusting their routing policies based on fabric wide environmental metrics. One aspect of the inventive subject matter includes a networking node (e.g., a router, a switch, a gateway, an access point, etc.) having plurality of communication ports. The communication ports can include wired, optical, wireless, or other types of ports; physical or logical. Networking nodes can include a fabric awareness module capable of obtaining fabric awareness information representing aspects of the fabric environment. The fabric awareness information can include fabric environment metrics across nodes of the fabric, and include differences in or among the metrics. The networking nodes can further include a routing policy generator configured to generate a routing policy for the node, possibly based on a policy template, as a function of the differences in the environmental metrics. As packet traffic passes through the networking node via the communication ports, a routing module forwards the packets according to the generated policy and according to packet attributes. In especially interesting embodiments, the network node is a member of a geographically distributed fabric where the cost of power varies by type of power (e.g., solar, wind, coal, gas, etc.), by region (e.g., state, county, city, etc.), by time (e.g., summer, winter, day, night, etc.), or other factors. The networking node forwards packets to optimize a cost factor based on the variances or differences in the metrics, possibly with respect to other networking metrics.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a networking infrastructure devices, various alternative configurations are also deemed suitable and may employ various hardware-based computing devices including servers, interfaces, modules, systems, databases, agents, peers, engines, controllers, or other types of computing devices operating individually or collectively. One should appreciate the computing devices comprise a hardware processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, within the context of this document, "coupled with" and "coupled to" can be considered to include the concept of two elements being communicatively coupled.

Networking nodes of a distributed fabric can be positioned nearly anywhere in the world, or even in extraterrestrial locations, Earth orbit for example within satellites. Each networking node is disposed within a local environment having one or more properties that can affect performance of the node. Each networking node's local environment can also impact the performance of the entire fabric not just the networking node is self. Thus, there can be substantial differences between the environmental properties associated with one networking node in the fabric and the environmental properties associated with a second networking node located elsewhere. Differences or variances among fabric metrics give rise to possible optimizations that can have dramatic impact on costs of maintaining the fabric at large.

Previous efforts appear to consider a network fabric as a single standalone entity rather than as an integrated system networking elements where networking nodes can aggregate or disaggregate in to federations providing services. Rather than viewing a fabric as a standalone entity, the Applicant has appreciated that system performance, system connectivity, system power consumption, system monetary cost, or other factors are highly relevant at different scales; from the global fabric level, through the federation level, or down to the networking node level. Such factors also apply even down to the internal component level; inter-core communications in a multi-core processor as an example. For example, one can apply the disclosed techniques to inter-core data forwarding within a multi-core processor.

Figure 1:
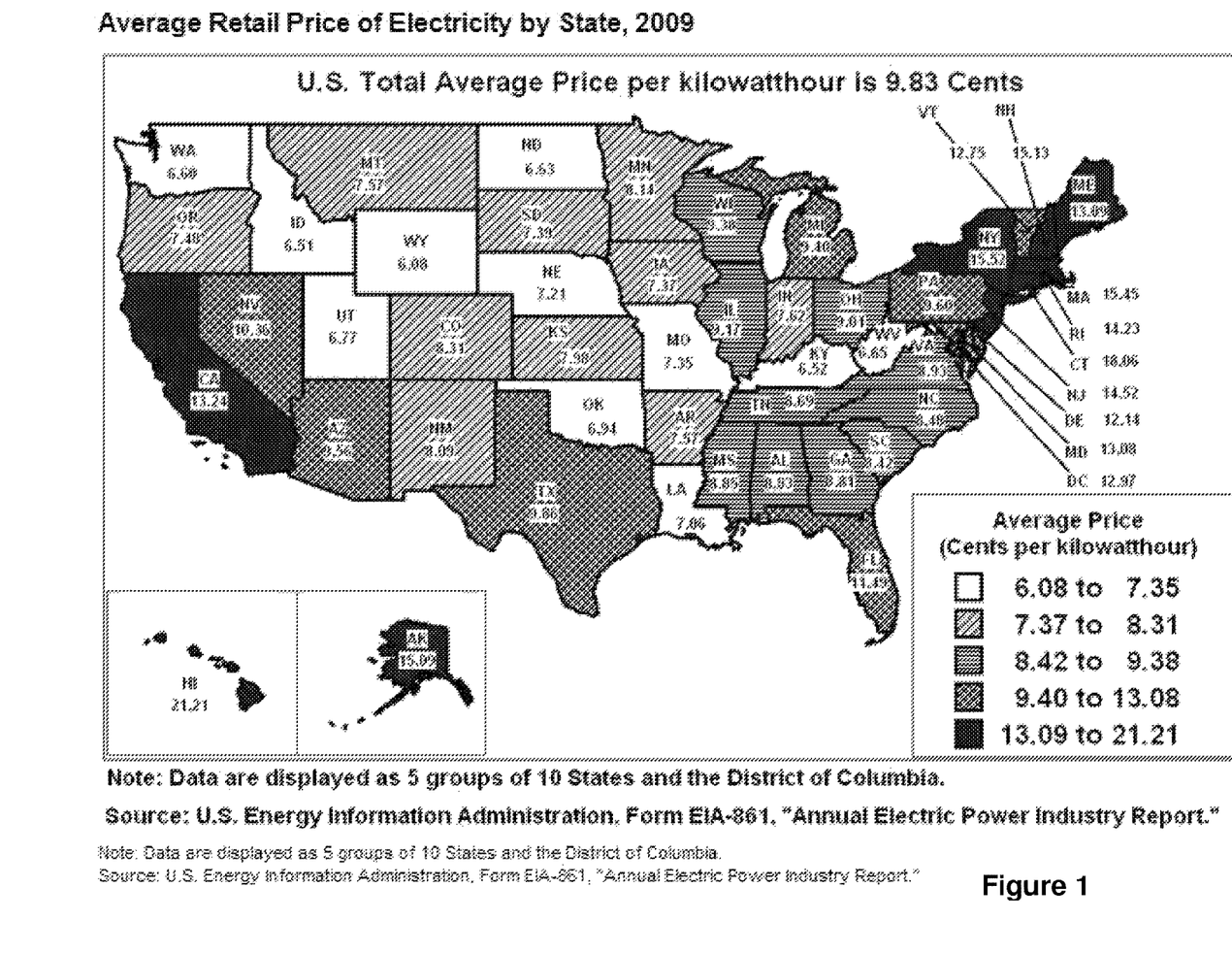
FIG. 1 depicts a map that presents the average cost of electricity on a state-by-state basis in the United States in 2009.

Consider FIG. 1, which presents average cost of electricity on a state-by-state basis in the United States. Networking nodes of a networking fabric can be deployed in any of the states. If one were to optimize traffic paths to minimize just power consumption, cost might be reduced somewhat. However, the actual monetary cost across the entire fabric would likely not be minimized because of difference in power costs across the geo-graphically distributed fabric. More succinctly, power minimization does not necessarily result in cost optimization. Reducing power consumption by an amount in West Virginia has less than one half the impact of reducing power in New York. Ideally, the networking nodes would adjust fabric operation to reduce cost, while still providing a quality of service rather than merely reducing a single parameter such as power consumption. For large scale network fabrics, the National Lambda Rail (see www.nlr.net) for example, spread across many states, the cost to operate the network can be quite significant due to the shear number of nodes and spread of the network across regions having expensive power costs.

Figure 2:
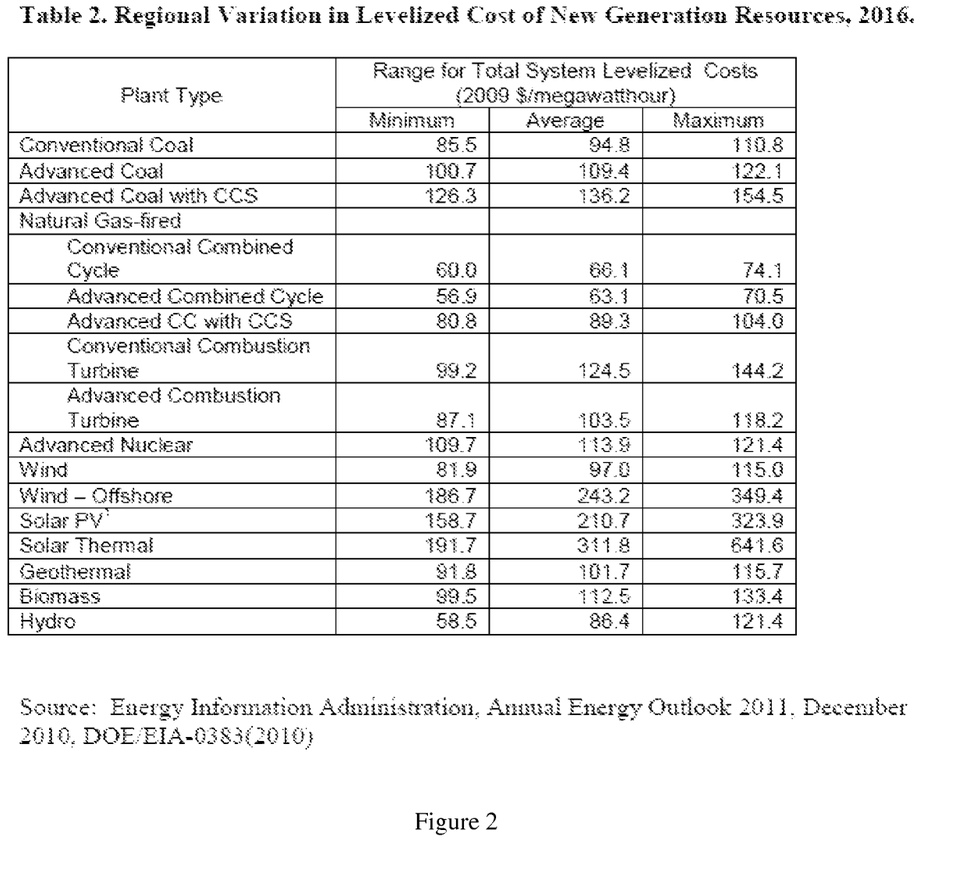
FIG. 2 depicts a table that presents regional variation in levelized costs of new generation resources.

FIG. 2 provides another example of cost variance where the cost of different types of electrical power varies by how it was generated. The costs presented in FIG. 2 are for the United States. However, one should appreciate that costs for types of electrical power can very according to other geo-political regions including a country, a state, a province, a county, a city, a town, a village, or other type of region. Still, further costs of electrical power can vary by time depending on when the power is consume. For example, power costs can vary by season, month, week, day, time of day, or other temporal factors. Power costs or other metrics can also vary due to influences from indirect factors: subsidies, licenses, relationships among regions or entities, or other indirect factors. Such indirect factors can also be brought to bear in determining routing policies for a fabric.

By constructing a fabric this is "self-aware" of its environment, the fabric can manage its roles or responsibilities to optimize itself according to one or more fabric metrics. For example, the fabric can route data traffic in a manner that reduces overall energy costs for the fabric as a whole. Local optimization does necessarily generate global optimization, especially in embodiments spanning across vast distances. Additionally, the fabric can route traffic according to the type of power used to power the local nodes. Such optimization can be applied to a globally or other geographically distributed fabric.

Figure 3:
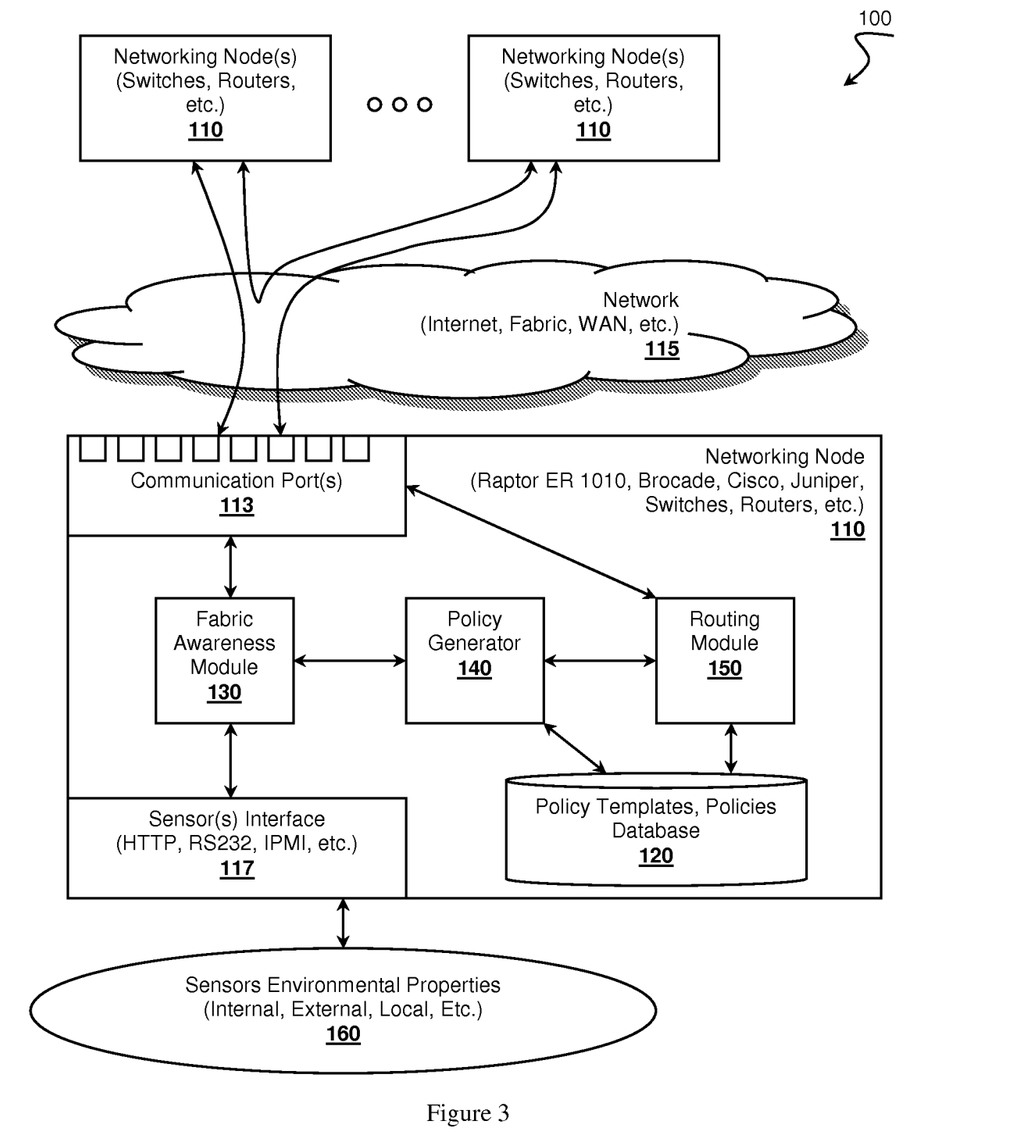
FIG. 3 depicts a networking node, in accordance with some example embodiments.

FIG. 3 presents ecosystem 100, which includes a possible embodiment for networking node 110. Networking nodes 110 can be members of a networking fabric among other similarly enabled networking nodes 110. Networking nodes 110 are similar in the sense they can each be configured to operate according to the disclosed techniques. There is no requirement that network nodes 110 be identical, fungible, or from even from the same manufacturer.

Networking 110 nodes include a plurality of communication ports 113 through which the networking node can exchange traffic packets with edge devices or other networking nodes 110 possibly over network 115. Example networking nodes 110 that can be suitability adapted to incorporate the inventive subject matter include Raptor Networking Technology switches, including the ER-1010 or other variants. Switches offered by other venders, including Cisco®, Juniper®, Brocade®, or others could also be adapted to conform to the disclosed inventive subject matter. Other types of networking nodes can include routers, access points, device servers, print servers, game consoles, or other nodes capable of receiving or transmitting data packets. Networking nodes could also include inter-core routers within a multi-core processor.

Communication ports 113 can include wired ports, wireless ports, or even optical ports (e.g., HiGig, HiGig2, etc.). In some embodiments the networking ports 113 can include logical ports where a physical port can incorporate more than one logical data channel, possibly including an addressable channel addressed by wavelength, frequency, signature, port identifier, polarization pattern identifier, or other parameter. A logical port is considered to represent at least one channel on a physical port. For example, an optical fiber port can include multiple logical ports where each logical port transports data at a different wavelength of light (e.g., 850 nm, 1300 nm, 1550 nm, etc.) or via different polarization states over a fiber coupled with the optical fiber port.

Networking nodes 110 can comprise one or more sensor interfaces 117, possibly operating as an HTTP server or other suitable communication interface (e.g., serial interface, RS-232, RS-485, cellular, Bluetooth, Zigbee, 802.11, CAN, SPI, etc.), capable of acquiring environmental properties 160 for the local environment of nodes 110 from one or more sensors (e.g., thermometers, power meters, accelerometers, camera, GIS sensors, user interfaces allowing administrator input, etc.). Each networking node 110 can collect a digital representation of its local environment where the digital representation includes information relating power costs or other environmental properties 160. Sensor interface 117 can include a direct connection to one or more sensors or an indirect connection through which environment properties 160 can be acquired. A direct connection could include one more sensors coupled with the networking node 110, possibly internal or external sensors. For example, networking node 110 could include internal sensors that detect temperature profiles, power consumption, traffic flow, processor utilization, memory utilization, storage capacity, or other internal properties. Example external environment properties can include location information (e.g., GPS, room, building, etc.), weather conditions, news events, or other information.

Sensors represent a broad spectrum of possible sensing equipment covering many modalities. Examples include acoustic or vibration sensors, chemical sensors, electrical sensors, fluid sensors, weather sensors (e.g., barometer, humidity, etc.), radiation sensor, optical sensors (e.g., camera, infrared, etc.), force sensors, proximity sensors, or other sensors. As an example, consider a scenario where networking node 110 is liquid cooled. Networking node 110 can include a fluid flow sensor monitoring the volume of liquid required to keep networking node 110 within a proper operating temperature profile. Environmental properties 160 can include a volume metric, which can then be mapped to a cost for maintaining a desired temperature. The cost can be calculated via different techniques, perhaps simply based on a cost of water assuming the liquid is water. Thus, environmental properties 160 can represent a broad spectrum of data modalities, which can then be mapped to fabric environment metrics applicable to the environment, possibly at one or more scales (e.g., whole fabric, federation, region, group, rack, chassis, cores, etc.).

Networking nodes 110 preferably collect or aggregate environmental properties 160 and combine the environmental properties 160 into fabric awareness information. In some embodiments, networking nodes 110 exchange fabric awareness information in the form of routing tables that include fabric environment metrics representative of each networking node's local conditions. The routing tables can provide each networking node 110 a holistic view of routing paths through the entire fabric from different fabric environment metric perspectives. For example, the routing tables can be constructed to route traffic in a manner that optimizes a desired fabric environment metric; to power costs, resource consumption, or even more esoteric metrics such as human resource metrics representing the number of staff of a Network Operation Center (NOC) or representing cost to have an administrator to service networking node 110 at a remote location.

The fabric awareness information can include differences among networking node's 110 conditions or circumstances. One especially interesting difference can include monetary cost of resources among geo-political regions. However, other differences are also contemplated, possibly including differences in temperature, type of energy costs, throughput, bandwidth, good-put, error counts, latency, or other factors. Once should note that differences do not necessarily require an arithmetic difference in a property metric, M, (e.g., $M_A - M_B$) between two nodes, but could also include difference in metric information available at each node. For example, a difference in a cost metric for power represents an arithmetic difference in a property. Alternatively, if a first network node 110 has an environment property representing water flow while a second node 110 does not, then the two nodes have a difference in available fabric metric information.

One should appreciate the differences in environmental metrics could be associated with different levels of granularity. As discussed previously, differences could be due to geographic differences (see FIG. 1) among nodes distributed over large geographic distances (e.g., greater than 10 Km). Other differences could arise from campus-to-campus, building-to-building, room-to-room, rack-to-rack, chassis-to-chassis, or even down to internal component-to-internal component in a chassis. Consider an example where fungible networking nodes 110 are distributed across the continent where each node 110 includes one or more multi-core processors. Each core could have roles or responsibilities with respect to routing or switching traffic. Further, each core could have a different temperature profile that could give rise to differences in environmental metrics, which could be brought to bear in how traffic is forwarded to control temperature profiles of the processors. Note such an approach does not require an actual monetary cost as a metric.

Each of networking nodes 110 can comprise a fabric awareness module 130 that collects environment awareness metrics from other networking nodes 110, possibly fungible nodes 110 of the fabric. Fabric awareness module 130 can combine or otherwise aggregate the metrics into a form useable by networking node 110. The aggregated awareness metrics can be passed to a routing policy generator 140 within the network node. Although some embodiments allow for each networking node 110 to compile and process fabric awareness metrics, in some embodiments a single networking node 110 operates as a fabric manager that governs the behavior of the entire fabric by generating desired routing behaviors from the collected fabric awareness metrics.

Routing policy generator 140 uses differences among the fabric environment metrics to generate a routing policy that can be applied to networking nodes 110 within the fabric. The routing policy can be based one or more templates stored in database 120 and that include prioritized criteria for forwarding traffic based on the metrics. The criteria can be populated according the actual metrics obtained from the fabric. The prioritized criteria comprise ranked rules that should be applied based on packet attributes and on environmental metrics. The ranked rules can also include a listing of preferred routes possibly order by the fabric metrics. If a packet or metric lacks attributes that trigger a first rule, then a second rule is checked until a routing rule is found. A default rule within the prioritized criteria can be simply a route based on a standard routing table. Such an approach allows each node to select a route that is considered to be sensitive to fabric optimization.

Referring back to the scenario of cost of power consumption, each route, path, port, or other routing element can be weighted by the cost of power at each network node 110 along a route. These weightings can be combined with the template to derive a routing policy for the local node 110 or even for remote networking nodes 110. One should appreciate that other factors can also apply to populate the routing policy based on a template from database 120. Other factors can include urgency, latency, class of traffic, quality of service (QoS), bandwidth, load, weather conditions, or other types of characteristics that can affect forwarding. Further, the factors can be based on packet attributes encoded within inter-frame headers, headers, or other portions of the packet (e.g., IP address, port identifiers, etc.).

One should further appreciate the policies can be determined as a function of the metrics beyond a straight one-to-one mapping of metric to policy rule. For example, cost of power can be balanced against quality of service. Thus, a policy rule can be derived based on two or more metrics. A corresponding policy could have a routing rule governed by a QoS metric among nodes 110 and a cost of power metric. Such a rule might require that QoS be maintained within 95% of a baseline while traffic is routed through less power consumptive or costly paths, which could increase latency. Such prioritized routing rules can be considered dynamic in the sense that they can change with time. To continue the QoS example, as traffic is routed to reduce power costs, the system can then route traffic to maintain QoS at the expense of cost to ensure desired user experience. Such an approach is considered advantageous because it allows for global optimization of the entire fabric through ensuring desirable behavior on average over time rather than requiring strict adherence to a rule at all points in time.

The populated routing policy can be submitted to one or more traffic routing modules 150 having the responsibility for forwarding packets from one communication port 113 to another. The routing module 150 inspects the attributes of the packet to determine which rules within the policy pertain to the packet based on the priority criteria within the populated policy. Then the routing module forwards the packet out the appropriate egress port 113 according to the policy's forwarding rules. Traffic routing module 150 can be configured to operate according to the nature of networking node 110. For example, in embodiments where networking node 110 comprises a switch, traffic routing module 150 would be configured to operate as a switch, possibly leveraging source or destination physical switch port identifiers to route packets. When networking node 110 comprises a router, traffic routing module 150 would be configure to operate as a router where packets are routed based on network addresses (e.g., URLs, transport layer ports, Internet protocol addresses (IPv4, IPv6, etc.), etc.) within the packets, etc.). One should appreciate that traffic routing module 150 be configured to operate as a router, an access point, a gateway, a firewall, a proxy, a name server, a repeater, an exchange, a hub, or other type of networking device.

In the circumstances where minimization of power cost is desirable, the routing policy could be configured to forward packets along paths have a low cost per power per packet metric. For example, each link to node 110 could be weighted as one divided by the cost (1/cost), where a high cost has a lower weight. One should note that the reciprocal cost is a simple weighting, while all cost-based weightings are contemplated. The routing policy can also fold in other parameters possibly as counter weights as discussed briefly with respect to QoS. For example, an urgent packet, or set of packets, can override the power consumption cost to achieve minimal latency. Real-time medical imaging supporting a surgeon in surgery might require low latency regardless of the cost, while an off-line genomic analysis might not have such strict latency requirements. The genomic analysis might require low monetary costs data transport or computation because it would be acceptable to receive the results seconds or even hours late.

Figure 4:
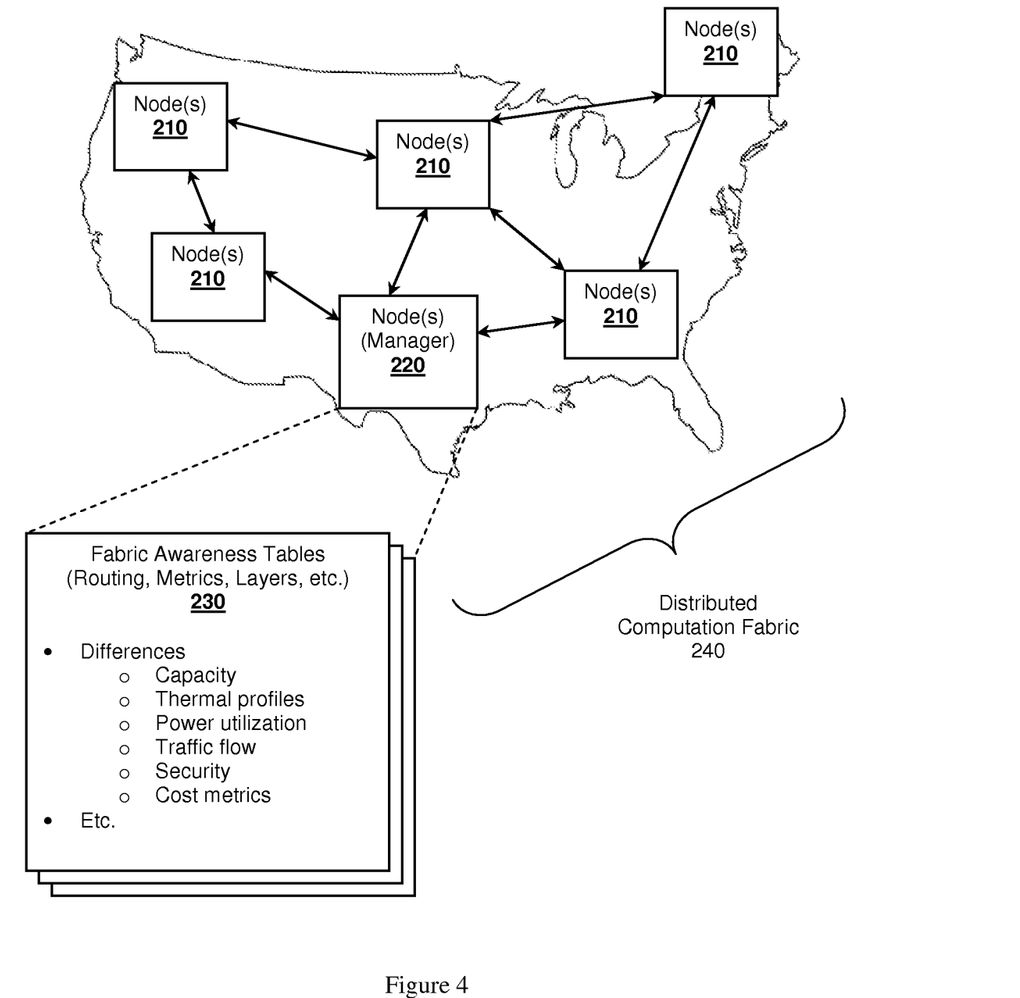
FIG. 4 depicts distributed network nodes in a fabric, in accordance with some example embodiments.

FIG. 4 presents an example where networking nodes 210 of fabric 240 are distributed over vast geographic distances. In the example shown, one networking node among other networking nodes 210 operates as a fabric manager 220. One should appreciate that any networking node 210 could operate as fabric manager 240. Fabric manger 240 collects the fabric awareness information from other networking nodes 210 where the fabric awareness information can be compiled in the form of one or more tables 230. For example, fabric awareness tables 230 could be supplied via XML tables, raw data, database files, CSV files, or other forms.

Tables 230 can comprise information relating to fabric 240 as a whole or portions (e.g., federations, regions, etc.) thereof, even down to a component level. Information in tables 230 can be stored using known techniques. For example, one table 230 can include power cost metrics associated with use of each port on each networking node event to the packet level. Each port could have a different per packet cost due to the nature of each port. Some ports might use optical fiber transceivers while others might use Ethernet PHYs to generate signals where the power consumption for each type of port would be different.

Each table 230 can be considered a layer or view of the fabric awareness information. For example, tables 230 could include capacity-weighted tables, thermal profile weighted tables, or other types of tables. Tables 230 can be considered somewhat orthogonal views of possible fabric awareness information where each view has corresponding routing tables. Each "view" can be combined with each other as desired to form a routing policy according to defined templates. Fabric manger 220 constructs tables 230 and can disseminate fabric awareness tables 230 to other networking nodes as desired or as necessary. When nodes 210 have fabric wide awareness, they can then route packets according to the rules required in tables 230 in a manner that is sensitive to the corresponding metric view.

Each fabric awareness tables 230 can include routing tables listing all possible routes by which traffic can be routed across fabric 240 to ensure the corresponding metrics are optimized. The routes listed in table 230 can be ranked or order as one or more preferred routes according the metric or metrics associated with the table. Each node 210 can leverage the preferred routes according to their local awareness metric, which could override global policies. For example, one of tables 230 can include a global power cost optimization, which lists two routes as preferred routes from coast-to-coast. However, an intermediary node 210 might have severe congestion on a port along the most preferred route. In response, the intermediary node 210 can take a less preferred route to avoid local congestion.

In some embodiments networking nodes 210 can be fungible with respect to management functions represented by fabric manager 220. Therefore, each node having management capabilities can also aggregate information from other nodes to build local fabric awareness information tables 230 or metrics. Again, such an approach is advantageous because fabric 240 can optimize power consumption at different scales. Such an approach gives rise to a fractal fabric metric optimization structure. Further, networking nodes 210 can originate from different manufacturers as along has the core roles or responsibilities are incorporated in the networking nodes. One aspect of the inventive subject matter is considered to include constructing or management of fabric optimization routing standards according to which third party manufacturers implement their specific networking nodes 210 (e.g., routers, switches, gateways, repeaters, access points, etc.).

As traffic is forwarded from one node 210 to another, each node 210 can derive one or more packet attributes from arriving packets. The attributes are compared against the generated routing policy stored on node 210 and that operates based on the fabric awareness metrics or other information. Through the comparison, node 210 can determine how to route the traffic to a next node so that the routing decision adheres to the node's stored routing policy. For example, a packet could include fabric ingress/egress port identifiers of the originating source port or ultimate destination port for the packet, possibly ports corresponding to edge devices located on opposite sides of the continent and located on different networking nodes 210. Node 210 can consult the routing policy, possibly constructed based on one or more layers in the fabric awareness information, to determine which local ports should be use to send out the packet. One should note that the system does not necessarily have to follow established routing paths. Rather, each node 210 can determine how best to forward a packet based on its available information as long as the decisions to forward the packets converge on a final destination while taking into other fabric environment metrics; monetary costs for example.

An astute reader will appreciate an environment that allows networking nodes 210 to make their own decisions on how to forward packets could result in fragmentation of traffic. Therefore, one aspect of the inventive subject matter includes consideration of which path combinations optimize the reassembly of various types of disaggregated traffic— whether that traffic might be for encryption, for disaggregated management, or for file size considerations (i.e., where a single path might exceed the residual bandwidth available for massive file transfers). Such an approach would address embodiments where data set size could be extremely large, a person's genome for example, when sent to a point of care. The techniques disclosed in co-owned U.S. Pat. No. 7,548, 545 to Wittenschlaeger titled "Disaggregated Network Management", filed May 13, 2008, can be leveraged to handle such scenarios.

Contemplated routing policies can include forwarding criteria that depend one or more of the fabric environmental metrics or packet attributes. Operational savings (e.g., performance, monetary costs, etc.) can be achieved when differences arise among the fabric environment metrics from one node 210 to another. When a node 210 detects a change in fabric environment metrics, possibly in real-time, the node 210 can update its routing policies accordingly taking into account the newly acquire information. In some embodiments, the differences in a metric, monetary cost for example, can represent a dominate parameter in the forwarding criteria relative to other metrics, latency for example. The routing policies can be based on a template having priorities on how to forward packets. For example, depending on the packet type, class, or other attribute, node 210 can select an appropriate prioritized forwarding rule as discussed previously.

The inventive subject matter can be applied beyond packet routing per se and can also apply to distributed computation. In some embodiments, networking fabric 240 comprises a distributed computation fabric where each networking nodes 210 (e.g., switch, router, etc.) is configured to support general purpose computing applications. The networking nodes can also construct one or more computation topologies to optimize one or more fabric environment metrics to align with a distributed application's purpose. For example, the disclosed techniques can be combined with the techniques disclosed in co-owned U.S. patent application having Ser. No. 12/849,521 filed Aug. 3, 2010, titled "Hybrid Transport—Application Network Fabric Apparatus" (see U.S. patent application publication 2010/0312913) to achieve greater efficiencies in constructing computation or routing topologies.

Yet another aspect of the inventive subject matter includes provisioning networking nodes 210 to take on a desired fabric environmental metric profile. Referring back to monetary cost, the distributed fabric manager 220 could instruct various nodes 210 to power down or enter a hibernation mode to reduce costs across the fabric until a desired cost profile has been achieved, at least to within acceptable thresholds. Another example includes instructing nodes 210 to align with a temperature profile. The temperature profile can require nodes 210 to shift locations of processing or power utilization to control hot spot location. The hot spots could be geographically distributed, distributed over a rack, within a chassis, or even within a multi-core processor. As an illustrative example consider a rack of switches, the rack can house multi-core switches operating as networking nodes 210 and could be instructed to shift their computations to distribute thermal load: even numbered chassis could shift processing to the right side of their chassis while odd numbered chassis could shift processing to the left side of the their chassis to distribute heat. The inventive subject matter is considered to include provisioning nodes 210 to take on specific environmental metric profiles at various granularities from fabric wide granularity down to an internal component level within one or more chassis (e.g., cores in a single processing element).

Power cost savings for large scale network fabrics can be quite dramatic when the disclosed techniques are utilized to manage the fabric. In such embodiments, the fabric environment metrics compiled by fabric manager 220 can include one or more monetary costs associated with geopolitical regions. Example monetary costs can include energy cost for the region, types of energy costs, average costs, variance of energy costs, or other forms of monetary costs. Although energy costs represent one type of very interesting costs, other costs could also be employed. For example, the monetary costs could include hourly rates of technicians that maintain nodes 210. The geo-political regions can also vary widely. Example geo-political regions include a country, a state, a province, a county, a city, a town, a village, a zip code, a precinct, a neighborhood, or other forms of political or geographic regions.

Differences among fabric metrics can exist at different points in time as well as at different locations in space (e.g., geographic location, surface versus orbit, etc.). Temporal differences in metrics can also give rise to optimization. Referencing back to the power consumption costs, a power cost metric could fluctuate by hour across a region according to a known pattern. Such historical knowledge can be brought to bear against developing corresponding routing policies. The historical information or pattern information can be a priori provided to the system or could be detected through observation by fabric manager 220. Thus, the prioritized routing policies can be based on temporal differences of fabric awareness metrics where preferred routes or prioritized route criteria fluctuate with time in a manner that reflects the temporal aspects of the corresponding metrics. For example, preferred routes can shift paths or the ranking of preferred routes can change to according to temporal rules.

Considering that fabric metrics can vary with time in expected or unexpected ways, the fabric awareness module within nodes 210 can observe or otherwise monitor changes in the fabric environmental metrics. The awareness module can observe internal metrics, local external metrics, region metrics, or even global fabric metrics. Upon detecting a change in a salient metric associated with tables 230 or corresponding routing policies, the awareness module possibly within fabric manager 220 can update corresponding routing policies to reflect the change to the changed metric. Further, fabric manager 220 can then construct updated fabric awareness tables 230 and disseminate the tables, or changes to tables 230, to nodes 210.

Network nodes 210 are presented as active devices capable of making routing decisions for packets or other types of data traffic. It is also contemplated that fabric 240 can include other types of nodes beyond active devices. In some embodiments, networking nodes 210 can include passive devices that do not make active decisions with respect to routing traffic. For example, a passive node could include a repeater (e.g., wireless repeater, an optical fiber repeater, etc.) that merely ensures signals are propagated correctly. In view that a passive node can also be part of the fabric and can impact metrics, the passive nodes can also supply fabric awareness information or metrics that can be used to generate routing policies for the whole fabric.

Yet another interesting aspect of the disclosed subject matter is that optimization occurs at various scales of the fabric. As a concrete example fabric 240 could include the National Lamba Rail (NLR; see www.nlr.net). Consider a fabric management interface capable of view a status of entire NLR at various scales. The management interface could viewing the entire NLR and provide a power cost metric for the entire NLR under its current routing configuration. As a user "zooms" into a more regional view, the total power cost metric can shift or be de-emphasized as the region's cost metric becomes more visible. Further zooming into the smaller scales, can give rise to finer granularity of data.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A node in a networking environment, the node comprising:
   at least one communication port;
   an environment sensor interface configured to acquire fabric environment sensor data and node data from a local environment in which the node is located and to combine the fabric environment sensor data and the node data into fabric awareness information, the fabric awareness information including environment sensor data for at least one other node of a network fabric including the node and the at least one other node, and the environment sensor interface coupled with at least one external sensor to detect one or more external environment properties of the local environment in which the node is located by acquiring the one or more external environment properties from the at least one external sensor, wherein the at least one external sensor includes at least one of an acoustic sensor, a vibration sensor, a chemical sensor, a fluid sensor, a weather sensor, a radiation sensor, an optical sensor, a force sensor, and a proximity sensor;
   a routing policy generator, coupled with the environment sensor interface, configured to generate a routing policy based on at least the fabric awareness information including the one or more external environment properties acquired by the at least one external sensor, and at least one prioritized rule; and
   a router, coupled with the routing policy generator, configured to route packets via the at least one communication port, the routing of the packets based on the routing policy and packet attributes.

2. The node of claim 1, wherein the node data includes data about packet-traffic routed via the node.

3. The node of claim 1, wherein the node data includes data about processor-utilization at the node.

4. The node of claim 1, wherein the node data includes data about storage-capacity at the node.

5. The node of claim 1, wherein the at least one communication port comprises logical ports including addressable channels.

6. The node of claim 5, wherein the logical ports are addressable via at least one of the following a wavelength, a frequency, a signature, and a port identifier.

7. The node of claim 1, wherein the router is configured to operate as a switch.

8. The node of claim 1, wherein the router is configured to operate as at least one of a router, an access point, a gateway, a firewall, a proxy, and a name server.

9. The node of claim 1, wherein the network fabric includes the node and other fungible nodes.

10. The node of claim 1, wherein the fabric environment sensor data comprises location information of the node and/or the at least one other node.

11. The node of claim 1, wherein the environment sensor interface is further configured to convert the fabric environment sensor data into local fabric environment metrics.

12. The node of claim 1, wherein the fabric awareness information comprises fabric environment metrics, and wherein the environment sensor interface is further configured to transmit local fabric environment metrics to other nodes of the network fabric.

13. The node of claim 1, wherein the fabric awareness information comprises a table of preferred routes based on at least one or more fabric environment metrics.

14. The node of claim 1, wherein the fabric awareness information comprises geographic region monetary costs of at least one resource in at least one geographic region.

15. The node of claim 14, wherein the geographic region monetary costs comprise energy costs.

16. The node of claim 14, wherein the geographic region monetary costs comprise a type of energy cost.

17. The node of claim 14, wherein the geographic region monetary costs comprise costs from at least one of an area, a country, a state, a province, a county, a city, a town, and a village.

18. The node of claim 1, wherein the router is configured to update the routing policy in real-time with respect to a change in the fabric awareness information.

19. The node of claim 1, wherein the routing policy is generated based on a cost of power balanced against quality-of-service.

20. A network routing system, comprising:
a node in a networking environment, the node comprising at least one communication port;
an environment sensor configured to acquire fabric environment sensor data and node data from a local environment in which the node is located and to combine the fabric environment sensor data and the node data into fabric awareness information, the fabric awareness information including environment sensor data for at least one other node of a network fabric including the node and the at least one other node, and the environment sensor interface coupled with at least one external sensor to detect one or more external environment properties of the local environment in which the node is located by acquiring the one or more external environment properties from the at least one external sensor, wherein the at least one external sensor includes at least one of an acoustic sensor, a vibration sensor, a chemical sensor, a fluid sensor, a weather sensor, a radiation sensor, an optical sensor, a force sensor, and a proximity sensor;
a routing policy generator, coupled with the environment sensor, configured to generate a routing policy based on at least the fabric awareness information including the one or more external environment properties acquired by the at least one external sensor, and at least one prioritized rule; and
a router, coupled with the routing policy generator, configured to route packets via the at least one communication port, the routing of the packets based on the routing policy and packet attributes.

* * * * *